United States Patent [19]
Takagi

[11] Patent Number: 5,266,983
[45] Date of Patent: Nov. 30, 1993

[54] CAMERA HAVING THE PLURAL PHOTOGRAPH FUNCTION

[75] Inventor: Tadao Takagi, Yokohama, Japan

[73] Assignee: Nikon Corporation, Tokyo, Japan

[21] Appl. No.: 687,003

[22] Filed: Apr. 18, 1991

[30] Foreign Application Priority Data

Apr. 23, 1990 [JP] Japan ............................ 2-105302

[51] Int. Cl.⁵ .............................................. G03B 7/00
[52] U.S. Cl. .................................. 354/412; 354/173.1
[58] Field of Search ......................... 354/412, 173.1

[56] References Cited

U.S. PATENT DOCUMENTS

| | | | |
|---|---|---|---|
| 4,734,727 | 3/1988 | Takemae | 354/412 |
| 4,812,870 | 3/1989 | Kawamura | 354/412 |
| 4,841,324 | 6/1989 | Ogasawara | 354/173.1 |
| 4,862,205 | 8/1989 | Kawamura | 354/412 |
| 4,914,466 | 4/1990 | Wakabayashi et al. | 354/412 |
| 4,918,481 | 4/1990 | Yasukawa et al. | 354/412 |
| 4,963,915 | 10/1990 | Ikemura et al. | 354/432 |
| 4,990,944 | 2/1991 | Yamamoto et al. | 354/173.1 |
| 5,016,039 | 5/1991 | Sosa et al. | 354/430 |
| 5,036,344 | 7/1991 | Inoue et al. | 354/412 |
| 5,065,232 | 11/1991 | Kondo | 354/145.1 |
| 5,086,314 | 2/1992 | Aoki et al. | 354/412 |
| 5,130,737 | 7/1992 | Azuma et al. | 354/416 |

Primary Examiner—Russell E. Adams
Attorney, Agent, or Firm—Shapiro and Shapiro

[57] ABSTRACT

A camera having the plural photograph function which can accomplish plural photographs in which a plurality of scenes of substantially the same composition are automatically photographed in succession under a plurality of photographing conditions set on the basis of an external condition detected by the camera outside.

17 Claims, 5 Drawing Sheets

| FIG. 3A |
| FIG. 3B |

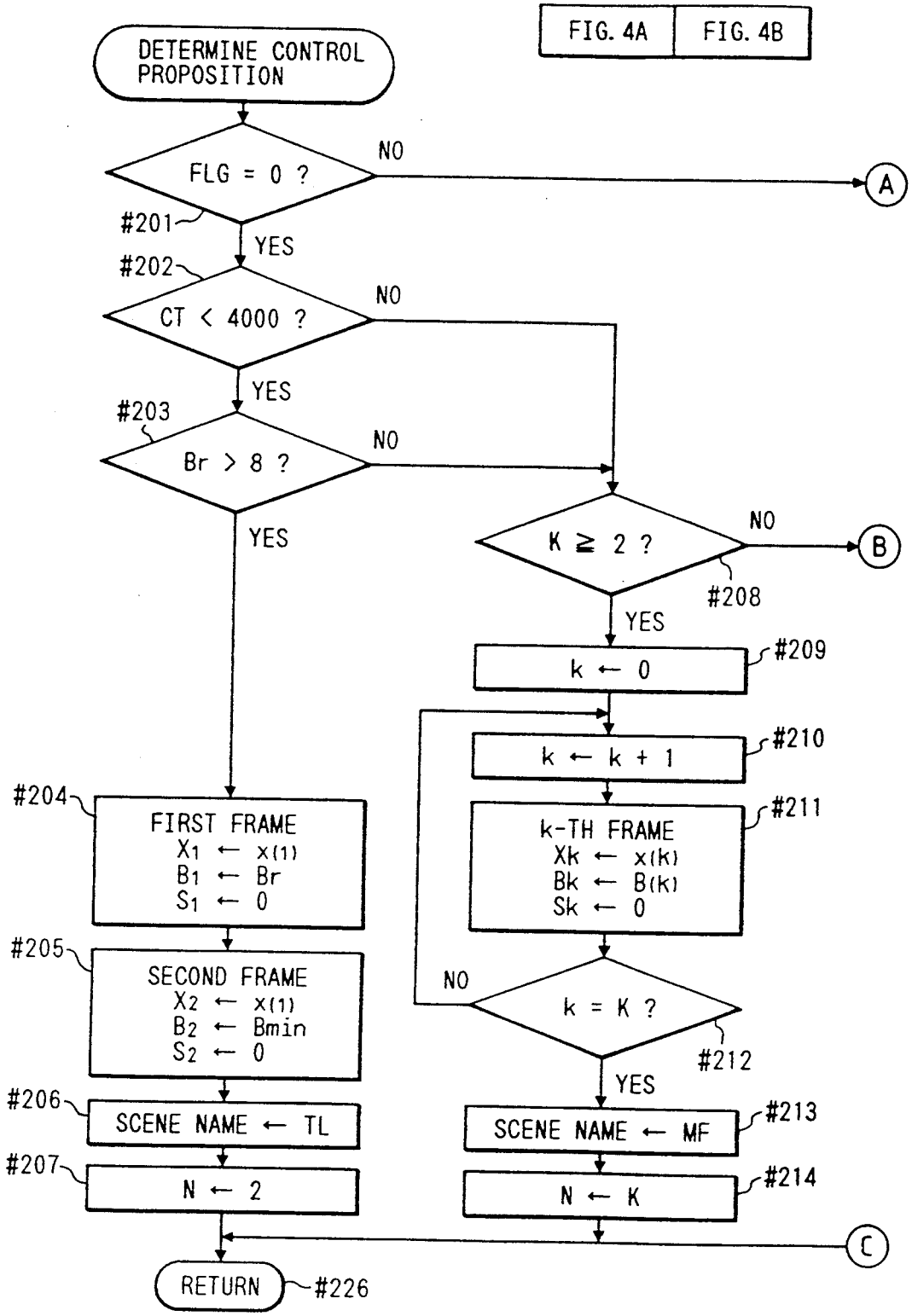

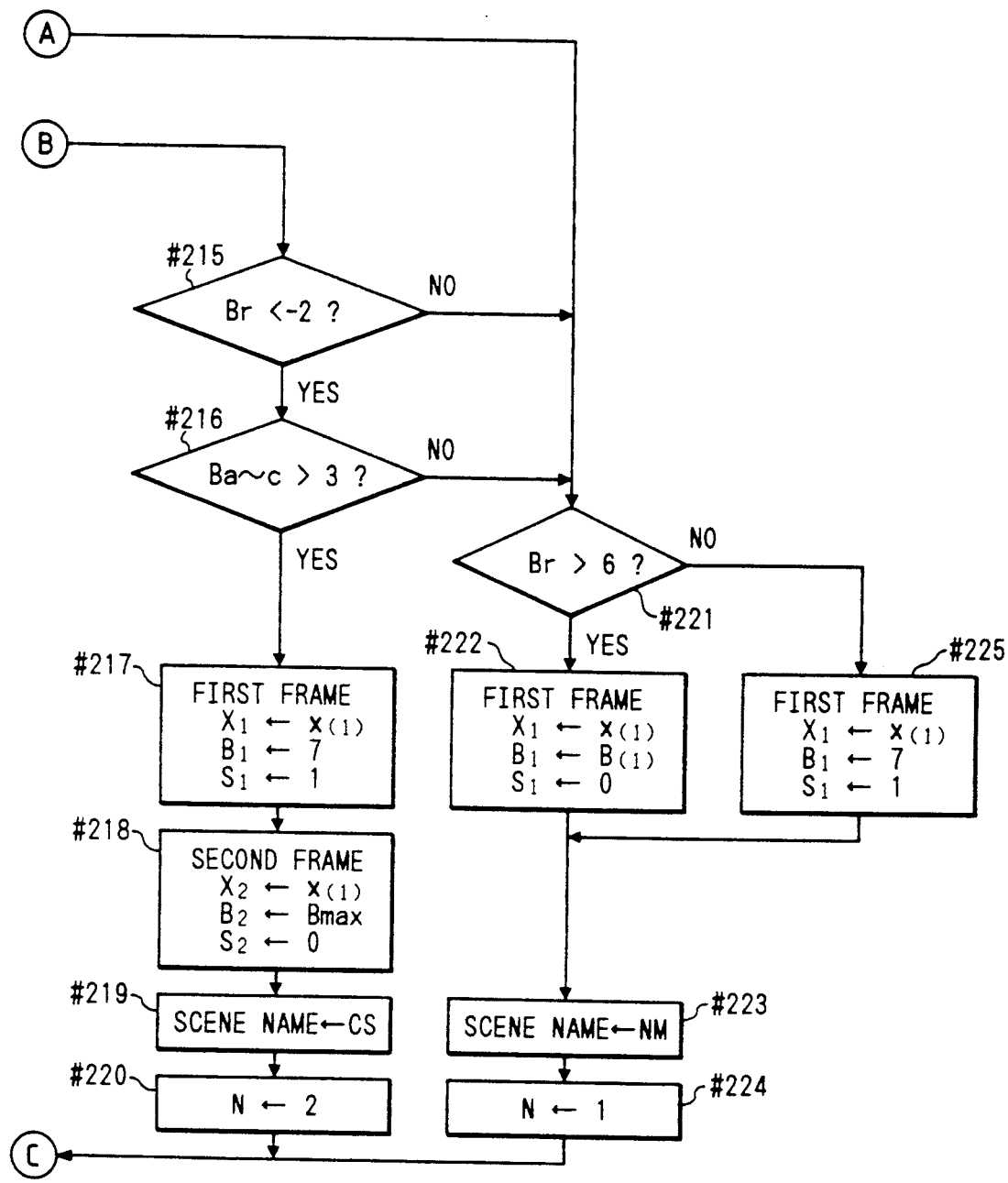

CAMERA HAVING THE PLURAL PHOTOGRAPH FUNCTION

BACKGROUND OF THE INVENTION

1. Field of the Invention

This invention relates to a camera having the plural photograph function.

More particularly, this invention relates to a camera having the plural photograph function of automatically photographing a plurality of scenes of the same composition in succession under a plurality of photographing conditions judged and set by the camera itself according to a detected external condition.

2. Related Background Art

As a camera having the plural photograph function, there is one like Nikon Camera F-801 equipped with data back MF-21. If a camera is equipped with data back MF-21 having the auto-bracketing function, it is possible to effect continuous photographing for a designated number of frames with a designated exposure level difference by the photographer's setting. This auto-bracketing function can be effective when the tolerance of proper exposure is narrow or when a small difference in brightness exists in a scene and it is difficult to determine proper exposure.

However, the camera as described above is based on the idea that only one basically proper exposure exists. Such camera is intended to take a plurality of photographs differing in exposure within the auto-bracketed range and to obtain a photograph of proper exposure among them.

Such a camera is not based on the idea that there are cases where there may be plural proper photographing conditions based, for instance, on proper focal length and the use of proper flash.

For example, when a figure is to be photographed with the evening sun as the background, there can be obtained a "proper" photograph even if the background becomes over-exposed and the photographing conditions are adjusted to the figure "with the background skipped over". There can also be obtained a "proper" photograph if emphasis is placed on the evening sun or the like as the background and exposure is adjusted to the background with the figure made into a silhouette. There can further be obtained a "proper" photograph if flash is used to provide twilight synchro.

As another example, in the candlelight service in a wedding dinner, if a bridal pair and guests are photographed by the use of flash or if only the bridal pair is photographed so as to be relieved by the candlelight without the use of flash, there can be obtained a "proper" photograph.

When photographing has been effected with a conventional camera set to the automatic mode, the camera has automatically selected only one proper photographing condition. Thus, it has been impossible to obtain a plurality of proper photographs based on the condition of the surroundings including the object field unless a photographer having a high-degree of skill takes photographs in the manual mode.

SUMMARY OF THE INVENTION

The present invention has been made in view of the aforementioned limitation of the prior art, and an object thereof is to provide a camera by which even a beginner can reliably take a plurality of proper photographs of the same scene, and thereby achieve greater versatility in phototaking.

In accordance with a principal aspect of the present invention, a camera is provided which automatically determines whether or not a plurality of frames should be exposed, based on a detected external condition. The camera sets the number of frames to be exposed and sets photographic control conditions differently for each frame. The control conditions may be set depending upon the detected external condition and may be based, for example, on a combination of at least two of film-to-object distance, brightness value, and whether flash is to be used. The plurality of frames are exposed in succession, continuously, in accordance with the respective control conditions set therefor.

In a preferred implementation, the exposure of the frames is conducted automatically in response to a single detection of a photographing-start signal produced by a release means, and the eternal condition includes at least one of color temperature, brightness, and film-to-object distance. The camera may also include means for inhibiting the plural photograph function when it is determined that a plurality of frames should not be exposed, thus avoiding unnecessary operation of the camera and the wasting of film.

Further features and advantages of the invention will be appreciated from the detailed description appearing hereinafter, taken in conjunction with the accompanying drawings.

BRIEF DESCRIPTION OF THE DRAWINGS

FIGS. 4, 4A and 4B together is a flow chart showing the details of a control proposition determining portion of the process shown in FIG. 3.

DETAILED DESCRIPTION OF THE PREFERRED EMBODIMENTS

An embodiment of the present invention will hereinafter be described with reference to FIGS. 1 to 4.

Figure 1:
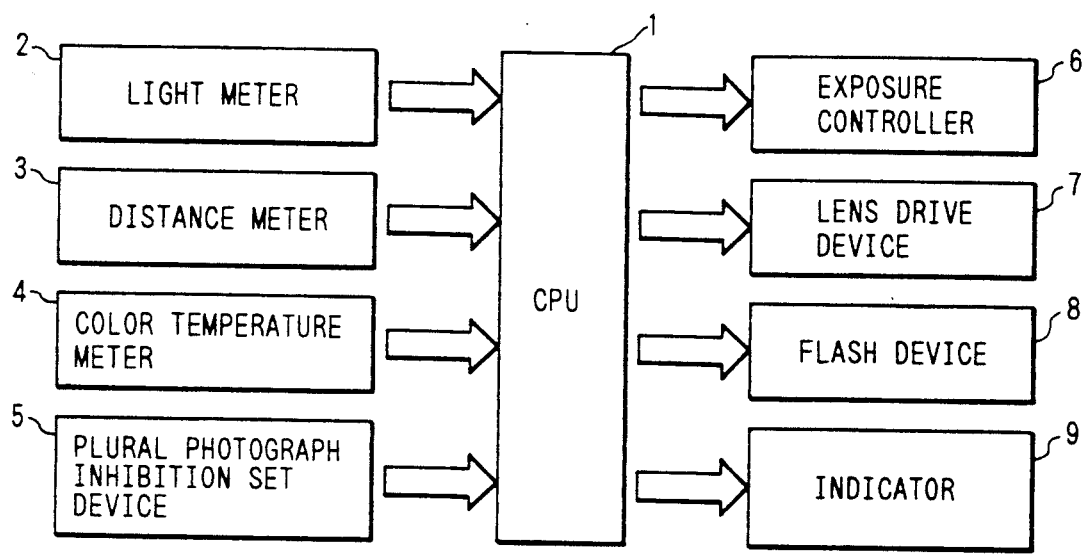
FIG. 1 is a block diagram of a camera according to the present invention.

FIG. 1 is a block diagram of a preferred embodiment of the present invention.

A light metering output, a distance metering output, a color temperature metering output and a setting result are input from a light meter 2, a distance meter 3, a color temperature meter 4 and a plural photograph inhibition set device 5, respectively, to a central processing unit (CPU) 1. The CPU 1 processes these inputs and provides appropriate out put to an exposure controller 6, a lens drive device 7, a flash device 8 and an indicator 9, respectively.

The CPU 1, the light meter 2, the distance meter 3, the color temperature meter 4, the plural photograph inhibition set device 5, the exposure controller 6, the lens drive device 7, the flash device 8 and the indicator 9 are conventional devices.

Figure 2:
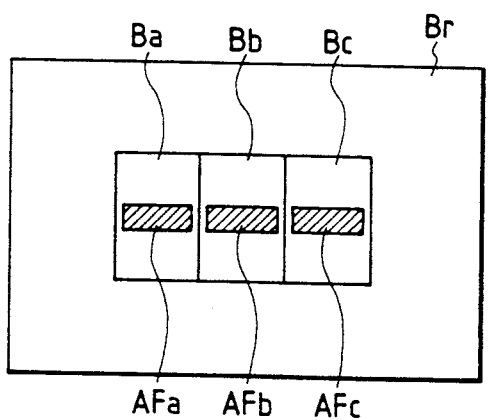
FIG. 2 represents the relation between distance metering and light metering areas.

FIG. 2 shows areas in which the light meter 2 and the distance meter 3 effect the light metering and the distance metering, respectively, of the object field at corresponding positions on the picture plane.

The light meter 2 effects the light metering of the object field to be photographed while dividing the object field into four areas, i.e., the central area, a central left area, a central right area and a marginal area, and obtains therefrom light metering values Bb, Ba, Bc and Br corresponding to brightness values and outputs them to the CPU 1.

The distance meter 3 effects the distance metering of the portions corresponding to the three central light metering areas, i.e., the center area, the central left area and the central right area, and obtains distance metering values AFb, AFa and AFc and outputs them to the CPU 1.

The plural photograph inhibition set device 5 is designed such that the photographer sets and releases inhibition by a member on the outside of the camera.

The flow of the process of the present embodiment will now be described with reference to FIG. 3.

Figures 3, 3A:
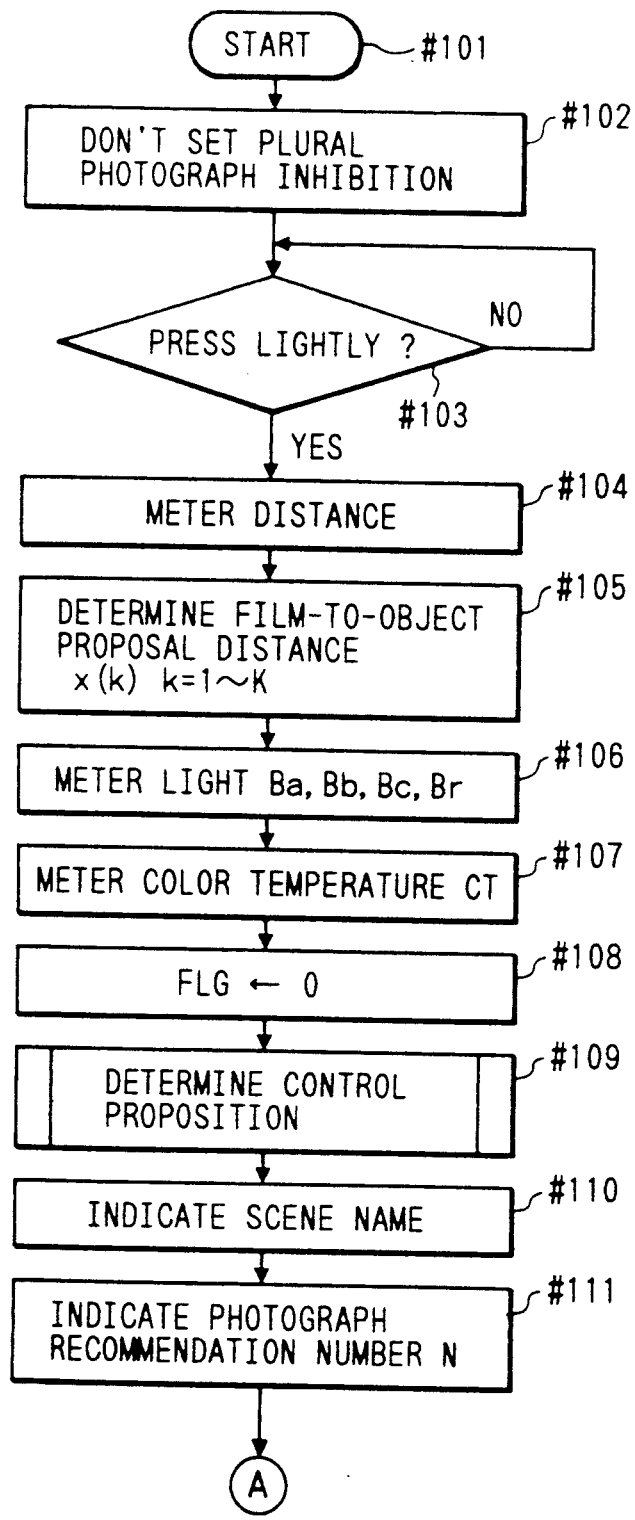
FIGS. 3, 3A and 3B together is a flow chart showing a process used in of the present invention.
Figure 3B:
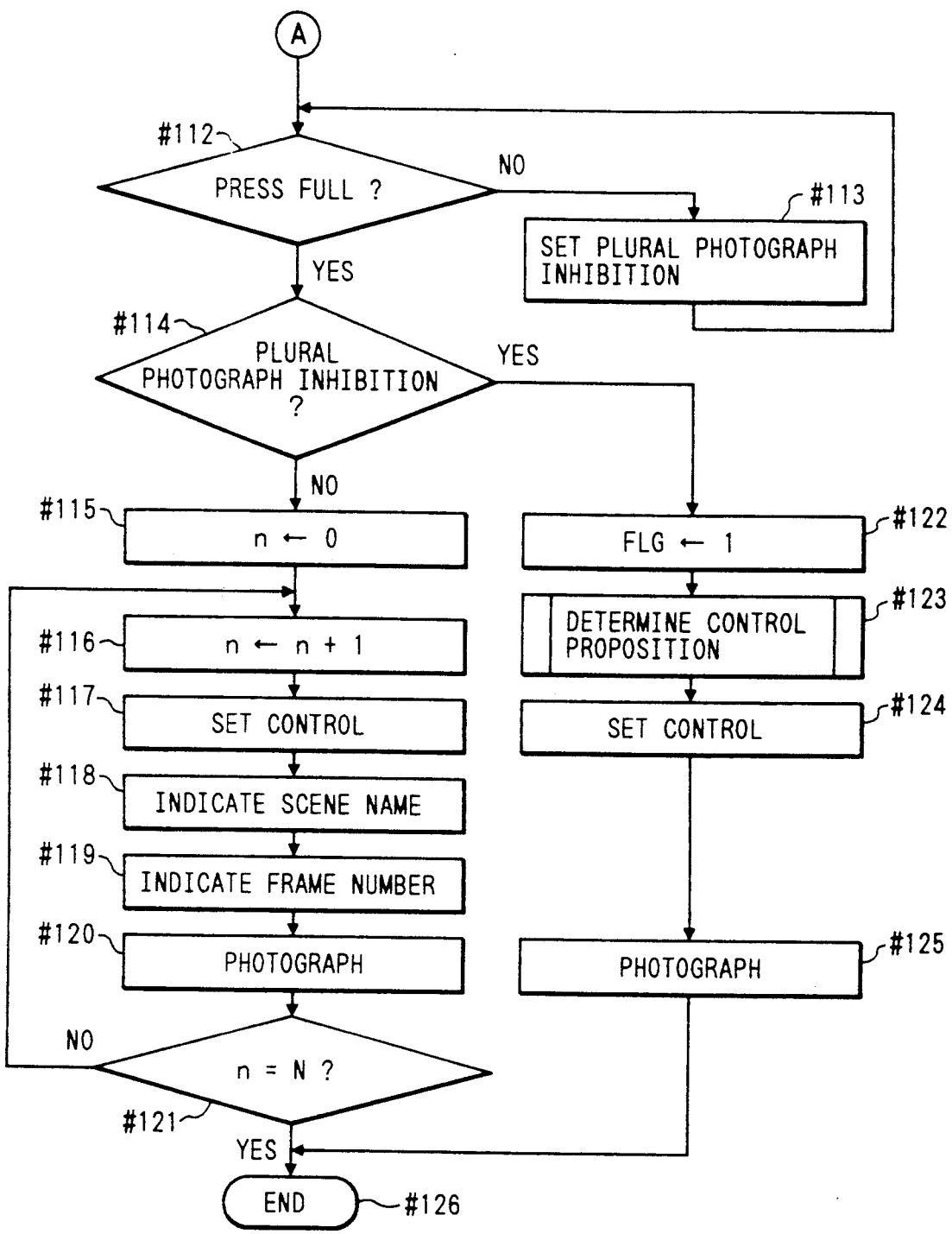

FIG. 3 is a flow chart of the program of that portion of the CPU 1 which relates to the present invention.

At a step #101, the flow starts and proceeds to a step #102.

At the step #102, the setting of plural photograph inhibition is not effected, that is, the photograph function is permitted and advance is made to a step #103.

At step #103, the light depression of the release button is awaited. When the release button is depressed lightly, advance is made to a step #104.

At the step #104, distance metering is effected by the distance meter 3, and advance is made to a step #105.

At the step #105, the effective film-to-object proposal distance x(k) is determined for one or more distance metering areas on the basis of the result of the distance metering. There are three distance metering areas, but distance metering is not always possible in all of the three areas. Accordingly, a film-to-object proposal distance x(k) is determined only for K areas where distance metering is possible. For example, if distance metering is possible in all three areas (all of AFa, AFb and AFc are effective), K = 3, and x(1) − x(3) are determined for x(k). Next, advance is made to a step #106. At the step #106, light metering in four areas is effected and four brightness values Ba, Bb, Bc and Br are obtained and advance is made to a step #107.

At the step #107, the color temperature metered value CT metered by the color temperature meter 4 is obtained and advance is made to a step #108.

At the step #108, 0 is substituted for FLG, and advance is made to a step #109.

At the step #109, a control proposition is determined and advance is made to a step #110.

The details of the determination of the control proposition at the step #109 will be described later with reference to FIG. 4.

At a step #110, the scene name of the control proposition determined at the step #109 is indicated, and advance is made to a step #111.

At the step #111, photograph recommendation number N is indicated and advance is made to a step #112.

At the step #112, full depression of the release button is awaited. If during the wait, plural photograph inhibition is re-set, this is determined a step #113. Then, return is made to the step #112.

When at the step #112, full depression is done, advance is made to a step #114.

At the step #114, whether the plural photograph function is inhibited is judged, and if the function is not inhibited, advance is made to a step #115.

At the step #115, 0 is substituted for n and initial setting is done, and advance is made to a step 116.

At the step #116, n+1 is substituted for n. 1 is first substituted for n, and advance is made to a step #117.

At the step #117, the control for photographing is set and advance is made to a step #118.

At the step #118, the scene name is indicated and advance is made to a step #119.

At the step #119, the frame number for photographing is indicated and advance is made to a step #120.

At the step #120, photographing is effected and advance is made to a step #121.

At the step #121, the routine of the steps #116−#120 is repeated until n reaches the photograph recommendation number N. Once n has reached N, advance is made to a step #126, where the flow ends.

Also, if at the step #114, the plural (continuous) photograph function is inhibited, advance is made to a step #122.

At the step #122, 1 is substituted for FLG and advance is made to a step #123.

At the step #123, control proposition is determined and advance is made to a step #124.

The details of the determination of the control proposition at the step #123 will be described later with reference to FIG. 4.

At the step #124, the result of the determination at the step #123 is set, and advance is made to a step #125.

At the step #125, photographing is effected and advance is made to the step #126, where the flow ends.

FIG. 4 shows the details of the flow of the steps #109 and #123 of FIG. 3.

At a step #201, whether the plural photograph function photograph is inhibited is judged. If the function is not inhibited, FLG=0 and advance is made to a step #202. If the function is inhibited, FLG=1 and advance is made to a step #221.

If at a step #202, color temperature is CT<4000[K], advance is made to a step #203. If not so, advance is made to a step #208.

If at step #203, the light metering value Br of the marginal portion is Br>8[Br], advance is made to a step #204. If not so, advance is made to step #208. It will thus be appreciated that advance is made to the step #204 in a state in which the plural photograph function is not inhibited, CT<4000[K] and the long wavelength side (i.e., the red side) is overwhelming, and further in which Br>8[Bv], that is, the marginal portion is in a bright "evening" condition. This is a case where the camera has recognized the "evening".

At the step #204, for a first frame, the photographing distance X1 is set to the film-to-object proposal distance x(1), exposure B1 is adjusted to the marginal portion and set to Br, and the condition that the flash device 8 does not emit flash (S1=0) is determined. This will achieve an exposure in which a figure is in silhouette with importance attached to the evening sun or the like as the background. After step #204, advance is made to a step #205.

At the step #205, for a second frame, the photographing distance X2 is set to the film-to-object proposal distance x(1) and exposure B2 is set to the minimum light metering value Bmin among Ba, Bb, Bc and Br, and the condition that the flash device 8 does not emit flash (S2=0) is determined. Under these condition the evening sun or the like as the background becomes over-exposed, and there is provided an exposure in which preference is given to a figure "with the exposure of the background skipped over". Next, advance is made to a step #206.

At the step #206, "TL" is given to the scene name, and at a step #207, 2 is given to the photograph recommendation number N, and advance is made to a step #226.

If at the step #202, color temperature is not $CT<4000[K]$, advance is made to a step #208. If at the step #208, the number of effective film-to-object proposal distances is plural ($K \geq 2$), advance is made to a step #209. At the step #209, 0 is set for k and advance is made to a step #210.

At the step #210, $k+1$ is substituted for k and advance is made to a step #211.

At the step #211, the k-th frame, the photographing distance XK is set to the film-to-object proposal distance x(k), the exposure Bk is set to the light metering value B(k) of the portion corresponding to the in-focus area, and the condition that the flash device 8 does not emit flash (Sk=0) is determined. Then, advance is made to a step #212.

At the step #212, the routine of the step #210-#211 is caused to be repeated until $k=K$. It is thus possible to properly photograph a plurality of figures each disposed at a different effective film-to-object proposal distance. Next, advance is made to a step #213.

At the step #213, "MF" is given to the scene name, and at a step #214, K is given to the photograph recommendation number N, and advance is made to a step #226.

If at the step #208, the film-to-object proposal distance is not plural advance is made to a step #215.

If at the step #215, $Br < -2[Bv]$, advance is made to step #216.

If at the step #216, at least one of Ba-Bc exceeds 3[Bv], advance is made to a step #217. This condition is, for example, that when a person has a candle in a dark room.

At the step #217, for a first frame, the photographing distance x1 is set to the film-to-object proposal distance x(1), exposure B1 is set to 7[Bv], and the condition that the flash device 8 emits flash (S1=1) is determined. Accordingly, the first frame provides an ordinary photograph using the flash device, but can surely catch an exposure opportunity. Then, advance is made to a step #218.

At the step #218, for a second frame, the photographing distance X2 is set to the film-to-object proposal distance x(1), exposure B2 is set to the maximum output Bmax among four outputs, and the condition that the reference light meter for focus detection and the flash device 8 do not effect flash (S2=0) is determined. Accordingly, the second frame can provide a photograph rich in atmosphere which does not use the flash device and in which candlelight and figures near it are relieved. Next, advance is made to a step #219.

At the step #219, "CS" is given to the scene name, and at a step #220, 2 is given to the photograph recommendation number N, and advance is made to step #226.

If at the step #201, FLG $\neq 0$, (that is, if the photographer sets plural photograph inhibition), and if at the step #215, Br is not $Br < -2$, and if at the step #216, all of Ba, Bb and Bc are 3 or less, advance is made to a step #221.

If at the step #221, $Br > 6[Bv]$, advance is made to a step #222.

At the step #222, the photographing distance X1 is set to the film-to-object proposal distance x(1), exposure B1 is set to the light metering value B(1) of the portion corresponding to the in-focus area, and the condition that the flash device, 8 does not emit flash (S1=0) is determined. Next, advance is made to a step #223.

At the step #223, "NM" is given to the scene name, and at a step #224, 1 is given to the photograph recommendation number N, and advance is made to a step #226.

If at the step #221, Br is not $Br > 6[Bv]$, advance is made to a step #225.

At the step #225, the photographing distance X1 is set to the film-to-object proposal distance x(1), exposure B1 is set to 7[Bv], and the condition that the flash device 8 emits flash (S1=1) is determined. At the step #223, "NM" is given to the scene name, and at the step #224, 1 is given to the photograph recommendation number N and advance is made to a step #226.

When at the step #208, $k \geq 2$, (that is, when there are a plurality of recommended photographing distances,) these distances have been mentioned as x(1), (x)2, ..., x(k), but this order may be changed to that from the short distance side, or the order may be determined based on what is high in priority such as the central portion of the picture plane.

As will be appreciated from the foregoing, according to the present invention, the camera itself automatically judges whether plural photographs should be taken and sets a plurality of proper photographing conditions in accordance with a detected external condition. When it is judged that plural photographs are necessary, a plurality of exposures are automatically made under the different photographing conditions, successively, by one release operation. Therefore, even a beginner can easily take proper photographs under a plurality of photographing conditions and thus realize a wide range of photographic capabilities, as well as possibly an expanded perspective on photographic expression.

For example, a plurality of proper photographs can be taken when a figure is to be photographed with the evening sun as the background or when the candlelight service in a wedding dinner is to be photographed.

When plural photographs are unnecessary, the plural photograph function is automatically inhibited, and a photograph under proper conditions is taken. Thus, the plural photograph function is not unnecessarily effected and film or the like is not wasted.

As will be appreciated by those skilled in the art, the above-described embodiment is merely illustrative, and various changes and modifications can be made in keeping with the principles and spirit of the present invention. For example, the external condition to be detected is not limited to brightness value, distance, color temperature, etc. of the object field, but broadly include whatever may affect photographing directly or indirectly, such as temperature, humidity, time and vibration.

Of course, the photographing conditions may include pursuit focusing, the front curtain and rear curtain synchronization in flash, exposure value correction, etc.

As another example, the plural photograph function in the "evening" mode may be conducted under three photographing conditions, with twilight synchro photographing being effected for the first frame by the use of flash, and for the second frame, photographing in which importance is attached to the evening sun or the like as the background and exposure is adjusted to the background with the subject in silhouette, and for the third frame, photographing with the background skipped over and emphasis given to the subject.

What is claimed is:

1. A camera having the plural photograph function and comprising:
    means for detecting an external environmental condition;
    means for automatically determining, based on the detected environmental condition, whether or not a plurality of frames of an image recording medium should be exposed,
    means for automatically setting a plural number of frames to be exposed when said determining means determines that a plurality of frames should be exposed, and for automatically setting photographic control conditions differently for each frame based on the detected environmental condition, and
    means for exposing said plurality of frames in succession, continuously, in accordance with the respective control conditions set therefor by said setting means.

2. A camera according to claim 1, including release means producing a photographing-start signal, means for detecting said photographing-start signal, and wherein said exposing means operates to expose all of said plurality of frames in response to a single detection of said photographing-start signal.

3. A camera according to claim 1, wherein said environmental condition is detected from an object field to be photographed.

4. A camera according to claim 3, wherein said environmental condition includes at least one of color temperature, brightness, and film-to-object distance.

5. A camera according to claim 4, wherein said environmental condition includes at least two of color temperature, brightness, and film-to-object distance.

6. A camera according to claim 1, including means for automatically inhibiting the plural photograph function when said determining means determines that a plurality of frames should not be exposed.

7. A camera having the plural photograph function and comprising:
    means for detecting an environmental condition,
    means for automatically determining, based on the detected environmental condition, whether or not a plurality of frames of an image recording medium should be exposed,
    means for automatically setting a plural number of frames to be exposed when said determining means determines that a plurality of frames should be exposed, and for automatically setting for each frame a different set of photographic control conditions based on a combination of at least two of film-to-object distance, brightness value, and whether flash is to be used, and
    means for exposing said plurality of frames in succession, continuously, in accordance with the respective control conditions set therefor by said setting means.

8. A camera according to claim 7, including release means producing a photographing-start signal, means for detecting said photographing-start signal, and wherein said exposing means operates to expose all of said plurality of frames in response to a single detection of said photographing-start signal.

9. A camera according to claim 7, wherein said environmental condition is detected from an object field to be photographed.

10. A camera according to claim 9, wherein said environmental condition includes color temperature and brightness.

11. A camera according to claim 7, including means for automatically inhibiting the plural photograph function when said determining means determines that a plurality of frames should not be exposed.

12. A camera having the plural photograph function and comprising:
    means for detecting an environmental condition,
    means for automatically selecting between the plural photograph function and single photograph function, based on the detected environmental condition,
    means operating when the plural photograph function is selected for automatically setting a plural number of frames of an image recording medium to be exposed and for automatically setting photographic control conditions differently for each frame based on the detected environmental condition, and operating when the single photograph function is selected for automatically setting photographic control conditions for a single frame, and
    means operating when the plural photograph function is selected for exposing said plurality of frames in succession, continuously, in accordance with the respective control conditions set therefor by said setting means, and operating when the single photograph function is selected for exposing said single frame in accordance with the control conditions set therefor by said setting means.

13. A camera according to claim 12, including release means producing a photographing-start signal, means for detecting said photographing-start signal, and wherein said exposing means operates to expose all of said plurality of frames in response to a single detection of said photographing-start signal.

14. A camera according to claim 12, wherein said environmental condition is detected from an object field to be photographed.

15. A camera according to claim 14, wherein said external condition includes at least one of color temperature, brightness, and film-to-object distance.

16. A camera according to claim 15, wherein said environmental condition includes at least two of color temperature, brightness, and film-to-object distance.

17. A camera according to claim 12, wherein said setting means sets photographic control conditions based on combinations of at least two film-to-object distance, brightness value and whether flash is to be used.

* * * * *